United States Patent [19]

Alexandridis et al.

[11] 3,775,602

[45] Nov. 27, 1973

[54] REAL TIME WALSH-HADAMARD TRANSFORMATION OF TWO-DIMENSIONAL DISCRETE PICTURES

[75] Inventors: Nikitas A. Alexandridis; Allen Klinger, both of Los Angeles, Calif.

[73] Assignee: The United States of America as represented by the Secretary of the Air Force, Washington, D.C.

[22] Filed: June 29, 1972

[21] Appl. No.: 267,718

[52] U.S. Cl. .............................................. 235/156

[51] Int. Cl. .............................................. G06f 7/38

[58] Field of Search ........................... 235/156, 154; 179/15 BC

[56] References Cited

OTHER PUBLICATIONS

William K. Pratt, "Hadamard Transform Image Coding," Proceedings of the IEEE, Vol. 57, No. 1, Jan. 1969, pp. 58–68

Harry C. Andrews, "A Generalized Technique For Spectral Analysis", IEEE Trans. on Computers, Vol. C–19, No. 1, Jan. 1970, pp. 16–25

H. C. Andrews, "Digital Image Transform Processing", Applications of Walsh Functions, 1970 Proceedings, pp. 183–194

*Primary Examiner*—Charles E. Atkinson
*Assistant Examiner*—David H. Malzahn
*Attorney*—Harry A. Herbert et al.

[57] ABSTRACT

A method and system for a computer implementation of a digital Walsh-Hadamard transformation of a two-dimensional discrete N×N figure. The elements of an N×N Hadamard matrix and the elements of an N×N matrix representing optical densities of the figure are factors in a first multiplication operation producing a matrix consisting of a series of column vectors. This matrix is again multiplied by the N×N Hadamard stored matrix in a second multiplication operation and selected products are summed to complete the matrix multiplication, the output thereof being entries in the Walsh-Hadamard transform.

1 Claim, 6 Drawing Figures

REAL TIME WALSH-HADAMARD TRANSFORMATION OF TWO-DIMENSIONAL DISCRETE PICTURES

BACKGROUND OF THE INVENTION

This invention relates to converting a picture into a system of digits, and more particularly to a computer implementation of a Walsh-Hadamard matrix transformation.

Photographs produced from an analog signal must be digitized for transmission or processing by a digital computer. This digitization is performed using cathode-ray tube scanners. A light beam passing through a transparency on a line-by-line basis, is converted to an electrical signal, and then digitized to a number, which depends upon the optical density of the transparency at the sampled point. Each sample is recorded on magnetic tape to be used for subsequent computer processing. During any computer operation, the picture is brought into core memory a few video scan lines at a time from tape.

The invention presented here obtains the Walsh-Hadamard transform of a picture in real time, i.e., each line which has been scanned and digitized is processed separately, and a matrix which is a partial result of the Walsh-Hadamard transform of the picture, is obtained. These partial transforms are accumulated for each processed video scan line. The transform of the picture is completed immediately after the last line of the picture has been digitized.

An N×N two-dimensional picture is approximated by a truncated Walsh-Fourier series where only the first $N^2$ expansion terms are retained. The $N^2$ coefficients of this expansion are obtained through the use of the first N Walsh functions. Matrix notation can be used in obtaining the discrete two-dimensional Walsh transform.

The system of Walsh orthogonal functions is the completion of the Rademacher functions. Walsh functions are used here to form an orthogonal matrix with entries ± 1, called a Hadamard matrix, which is used in obtaining the Walsh-Hadamard transform of the picture. The term "Walsh-Hadamard" transformation is used to refer to the discrete Walsh transform expressed in matrix form with the use of the Hadamard matrix. Such a transform has been used as a technique for the transmission of digital images over a channel. Since the Walsh-Hadamard transform deals only with real numbers, it has certain advantages over the Fourier transform with its complex numbers. Using the matrix form, high-speed computational algorithms can perform fast Walsh-Hadamard transformations.

The present invention is a new system for expressing the Walsh-Hadamard transform of a picture. Through the decomposition theorem the transform is obtained in a digital computer by processing one line of the picture at a time. One video scan line is brought into core memory from tape and the partial Walsh-Hadamard transform is obtained using the decomposition theorem. The accumulation of the partial transforms of all lines represents the Walsh-Hadamard transform of the picture.

The Walsh-Hadamard transform is obtained in real time by operating on each scanned line as it is brought into core without waiting until the whole picture is in core before starting the transform operation. Overlapping of transmission and computation may take place, i.e., while a line is brought into core, calculations on the samples of the previous line are performed to obtain a partial Walsh-Hadamard transform. This results in savings of the total time required to transform a picture.

The storage requirements to obtain the Walsh-Hadamard transform of an N×N picture are $N^2$ storage locations for the picture, the algorithm for obtaining the entries of the Hadamard matrix, and $N^2$ storage locations for the resulting transformed matrix. On the other hand, the decomposition theorem requires N locations for one line of the picture, and $N^2$ locations for the transformed matrix along with the algorithm for generating the Hadamard matrix. The ratio of storage requirements is given by $2N^2/(N+N^2) = 2/[1 + (1/N)]$ which results in approximately 2:1 storage reduction as the dimensionality of the picture increases.

Using the decomposition theorem, a machine has been designed to perform parallel Walsh-Hadamard transformation. The whole N×N picture is shown to this machine, which operates simultaneously upon all elements of the picture and produces an N×N Walsh-Hadamard transform.

The theorem for decomposition by column of binary pictures can be conveniently used for processing and transmitting figures already in core memory; for example, biological pictures of upright rotated chromosomes from one medical center to another in a computer network. According to this theorem, each column of the picture is examined for runs of 1's. The theorem shows that what is important from each run of 1's in a column is the numbers of the beginning and ending rows; in other words, the boundary points of the image. These boundary points can be obtained by digitally subtracting the image from a copy of it, vertically shifted by one row.

SUMMARY OF THE INVENTION

Based upon the decomposition theorems, this invention presents a system for parallel Hadamard transformation of pictures; i.e., operating simultaneously upon all elements of the picture. Outputs of the parallel machine are the spectral components or coefficients of a Walsh-Fourier expansion. The practical problem solved by this invention is that the signal samples are developed in the course of time and are not immediately available as a simultaneous set of magnitudes.

A picture is scanned and the samples arrive a row at a time. The equipment can generate the $j^{th}$ Hadamard row vector at the instant $i$, simultaneously with the arrival of sample $a_{ij}$. The product of the sample times the vector components can be stored into an array of accumulating amplifiers until the sum of N such products has been stored. At this point, the first row of the picture has been used to calculate row vector $\underline{F}_i$. The contents of these accumulating amplifiers can then be read into holding circuits and the accumulators cleared for the next operation. Before starting the next operation, however, the contents of the holding circuits (the components of vector $\underline{F}_i$) are multiplied (vector outer product) by the $i^{th}$ column vector $\underline{h}_i'$. The results are stored into a second array of $N^2$ accumulating amplifiers which hold the product $\underline{h}_i' \underline{F}_i$. This product constitutes the $i$th partial transform of matrix of samples A.

The above steps are performed each time for the N samples of a picture row. When this has been repeated N times, the second array of $N^2$ accumulating amplifiers holds the $N^2$ spectral components, the Walsh-Hadamard transform of A. This transform is ready immediately after the last sample of the last row of the picture has arrived.

It is therefore an object of the invention to provide a method and apparatus for converting a two-dimensional picture into a system of digits in real time.

It is another object to provide a method and apparatus of digitally transforming a discrete two-dimensional picture using only real numbers.

It is still another object to provide a matrix method and system of transforming a two-dimensional picture into digits suitable for high-speed computational algorithms.

It is yet another object to provide a method and apparatus for real time digital transformation of discrete two-dimensional pictures which reduce the requirements of computer storage space.

These and other objects, features and advantages of the invention will become more apparent from the following description taken in connection with the illustrative embodiment in the accompanying drawings.

DETAILED DESCRIPTION OF THE PREFERRED EMBODIMENT

Figure 1:
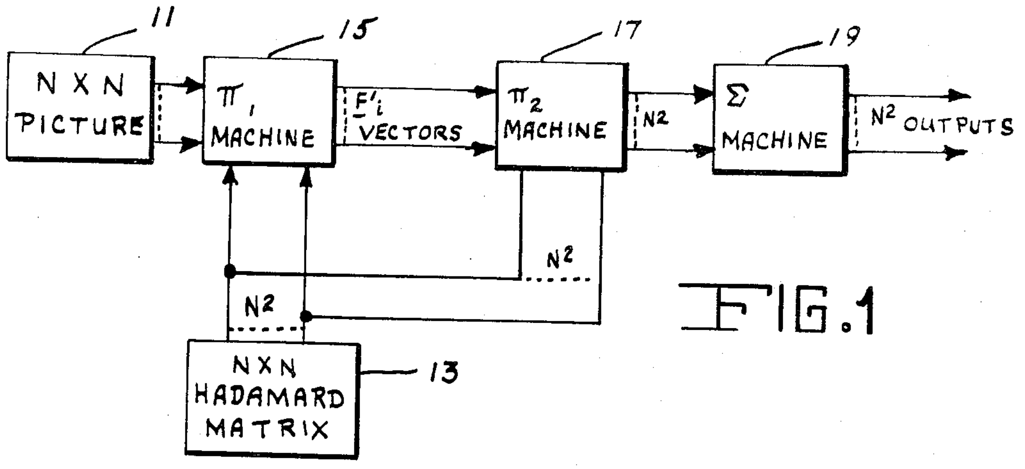
FIG. 1 is a block diagram of the apparatus that implements parallel Walsh-Hadamard transformations.

Each row or column of a Hadamard matrix is a Walsh function, and all rows and columns are orthogonal to each other. When the order is restricted to a power of 2, $N = 2^n$, the high order Hadamard matrices can be generated from the lower order matrices using matrix Kronecker products. When operating with Kronecker products within a computer it is possible to store a representation of the entries of the matrix rather than the matrix itself. Such a matrix factorization results in a more efficient means of implementation. This matrix generated from Kronecker products is symmetric and is in the unordered or natural form, i.e., the sequency (the number of zero crossings) does not increase with the increase of the number of each row or column. A method is now available for generating Walsh functions (rows of the Hadamard matrix) from their sequency (row) number, with advantages for computer applications where the memory size is limited.

In this description of the invention vectors are defined as row vectors unless otherwise stated. Each Walsh function in a Hadamard matrix of order N is referred to as a Hadamard vector and is denoted by $\underline{h}_m = [h_{m0}, h_{m1}, \ldots h_{m(N-1)}]$. The N Hadamard column vector is denoted by $\underline{h}'_n$, and the $ij$ matrix entry by $h_{ij}$.

The Hadamard vectors of a matrix of order $N=2^n$ form an orthogonal basis in the N-dimensional vector space. The sum of all N Hadamard vectors yields a vector, which has all entries equal to zero except the first entry which equals N. Hadamard vectors from an Abelian or commutative group under direct vector multiplication given by $$(\underline{h}_m)(\underline{h}_k) = [h_{m0}h_{k0}, h_{m1}h_{k1}, \ldots, h_{m(N-1)}h_{k(N-1)}]. \quad (1)$$

which corresponds to modulo 2 addition of the respective vector components when $$1 \oplus 1 = -1 \oplus -1 = 1 \quad (2)$$

$$1 \oplus -1 = -1 \oplus 1 = -1$$

The direct product of two Hadamard vectors yields another Hadamard vector.

Let $A = [\ a_{ij}\ ]$ be an $N \times N$ discrete two-dimensional function. Let $H$ be the $N \times N$ Hadamard matrix, $\underline{h}_i = [H_{i0}, h_{i2}, \ldots, h_{i(n-1)}]$ the $(i+1)^{th}$ Hadamard row vector, and $\underline{h}'_i$ its transpose. Then A can be expanded into a two-dimensional Walsh-Fourier series. The order of A determines the number of terms used in the truncated series approximation. The derivation of this expansion, which follows:

$$A = \frac{1}{N^2} HBH = \frac{1}{N^2} \sum_{i=0}^{N-1} \sum_{j=0}^{N-1} b_{ij} \underline{h}_i' \underline{h}_i$$
$$= \frac{1}{N_2} b_{00}\underline{h}_0'\underline{h}_0 + b_{01}\underline{h}_0'\underline{h}_1 + \ldots + b_{0(N-1)}\underline{h}_0'\underline{h}_{N-1}$$
$$+ b_{10}\underline{h}_1'\underline{h}_0 + b_{11}\underline{h}_1'\underline{h}_1 + \ldots + b_{1(N-1)}\underline{h}_1'\underline{h}_{N-1} + \ldots$$
$$+ b_{(N-1)}b'_{0-N-1}\underline{h}_0 + b_{(N-1)1}\underline{h}'_{N-1}\underline{h}_1 + \ldots$$
$$+ b_{(N-1)(N-1)}\underline{h}'_{N-1}\underline{h}_{N-1} \quad (3)$$

$\underline{h}'_i\, h_i$ represents the outer product, and $b_{ij}$ is a Walsh-Fourier coefficient given by $$b_{ij} = \underline{h}_i\ A\ \underline{h}'_j \qquad i, j = 0, 1, \ldots, N-1 \quad (4)$$

These coefficients $b_{ij}$ constitute the sequency spectrum of A. The first part of Equation (4), $\underline{h}_i$A, is the dot product of the row vector $\underline{h}_i$ times each column of picture A. This product generates a row vector $y$ where $$y_1 = \sum_{k=0}^{N-1} h_{ik} a_{k1}. \quad (5)$$

Then $b_{ij}$ represents the dot product of the vector $\underline{y}$ times the column vector $\underline{h}'_j$.

$$b_{ij} = \sum_{l=0}^{N-1} y_l h_{lj} \quad (6)$$

$$B = HAH \quad (7)$$

is the matrix form of the two-dimensional Walsh-Hadamard transform of $A$. Each $b_{ij}$ is a Walsh-Fourier coefficient used in the Walsh-Fourier expansion of $A$. When $A$ represents a picture, each $a_{ij}$ element is an intensity sample of the figure. The zero-sequency coefficient $b_{00}$ is a measure of the total brightness of picture A. Through the Walsh-Hadamard transform, a picture is decomposed by a set of rectangular waveforms instead of the sine-cosine waveforms associated with the Fourier transform.

Equation (7) suggests that the whole picture must be stored in memory to obtain its Walsh-Hadamard transform by the matrix product. A typical picture of 500,000 samples, where each sample is represented by one byte, would require 500,000 bytes of computer core memory. Furthermore, the process for obtaining the transform through Equation (7) starts after the whole picture has been digitized and stored in memory.

Using the decomposition theorems, each picture line which has been scanned and digitized is processed separately. The two-dimensional transform is expressed as the superposition of the partial transforms of each row or column of the picture. Each row of the Walsh-Hadamard transformed matrix is the sum of rectangular waveforms of various amplitudes and sequencies.

In explaining the theorem for decomposition by row assume that $A=[a_{ij}]$ is an N×N picture. $\underline{h}'_i$ is the transpose of the $i^{th}$ row vector of the symmetric N×N Hadamard matrix, expressed as $$\underline{h}_i'=\begin{bmatrix} h_{1i} \\ h_{2i} \\ \cdot \\ \cdot \\ \cdot \\ h_{Ni} \end{bmatrix} \qquad (8)$$

Let $\underline{F}_i$ be a row vector given by $$\underline{F}_i=[f_{i1}, f_{i2}, \ldots, f_{iN}]=\sum_{j=1}^{N} a_{ij}\underline{h}_j. \qquad (9)$$

(For simplification of notation, from now on indices vary from 1 to $N$ instead of 0 to $N-1$.)

$$f_{ik}=\sum_{j=1}^{N} a_{ij}h_{jk}. \qquad (10)$$

Then the Walsh-Hadamard transform of A is expressed as $$B=\sum_{i=1}^{N} \underline{h}_i'\underline{F}_i. \qquad (11)$$

Each matrix generated from the outer product of $\underline{h}_i'$ $\underline{F}_i$ constitutes a partial transform of A. The sum of all these partial transforms defines the Walsh-Hadamard transform of the picture.

In explaining the theorem for decomposition by column let $[\underline{h}_i=h_{i1}, h_{i2}, \ldots, h_{iN}]$ be the $i^{th}$ row vector of the symmetric N×N Hadamard matrix H, and let $\underline{F}_i'$ be the column vector $$\underline{F}_i'=\begin{bmatrix} f_{1i} \\ f_{2i} \\ \cdot \\ \cdot \\ \cdot \\ f_{Ni} \end{bmatrix}=H\underline{A}_{ik} \qquad (12)$$

$$f_{ki}=\sum_{j=1}^{N} h_{kj}a_{ji} \qquad (13)$$

where $\underline{A}_i'$ is the $i^{th}$ column vector of picture A. Then the Walsh-Hadamard transform of A is given by the sum of outer products $$B=\sum_{i=1}^{N} \underline{F}_i'\underline{h}_i. \qquad (14)$$

Each outer product $\underline{F}_i'h_i$ is a partial Walsh-Hadamard transform, and $\underline{F}_i'$ is defined as the projection of the N-dimensional $i^{th}$ column pattern of picture A on the complete Walsh orthogonal basis.

It is possible to have decomposition by column of binary pictures. The Walsh-Hadamard transform of a binary figure A composed of vertical lines of 1's in columns $i, j, k, \ldots, l$, and in rows $a$ to $b$, $c$ to $d$, $e$ to $f$, . . . , and $m$ to $n$, respectively, can be expressed as $$B=(\underline{F}_i^{a,b})'\,\underline{h}_i+(\underline{F}_j^{c,d})'\,\underline{h}_j+(\underline{F}_k^{e,f})'\,\underline{h}_k+\ldots+(\underline{F}_l^{m,n})'\underline{h}_l \qquad (15)$$

$(\underline{F}_i^{a,b})'$ is a column vector whose superscrips $a$, $b$ denote the numbers of the beginning and ending rows for a run of 1's in column $i$. It is expressed as $$(\underline{F}_i^{a,b})'=\begin{bmatrix} \sum_{j=a}^{b} h_{1j} \\ \cdot \\ \cdot \\ \cdot \\ \sum_{j=a}^{b} h_{Nj} \end{bmatrix} \qquad (16)$$

where $h_{ij}$ is the $ij^{th}$ element of the Hadamard matrix.

Referring to FIG. 1, the $N^2$ picture samples 11 are read into $N^2$ holding circuits (not shown). The values of the $N^2$ elements of the Hadamard matrix 13 are permanently connected to the apparatus. Each column of the picture is used separately and all columns are processed simultaneously in parallel. The N×N matrix generated from processing one column is a partial Walsh-Hadamard transform of the input picture. The N partial transforms are added together in parallel to give the N×N Walsh-Hadamard transformed matrix.

Figure 2:
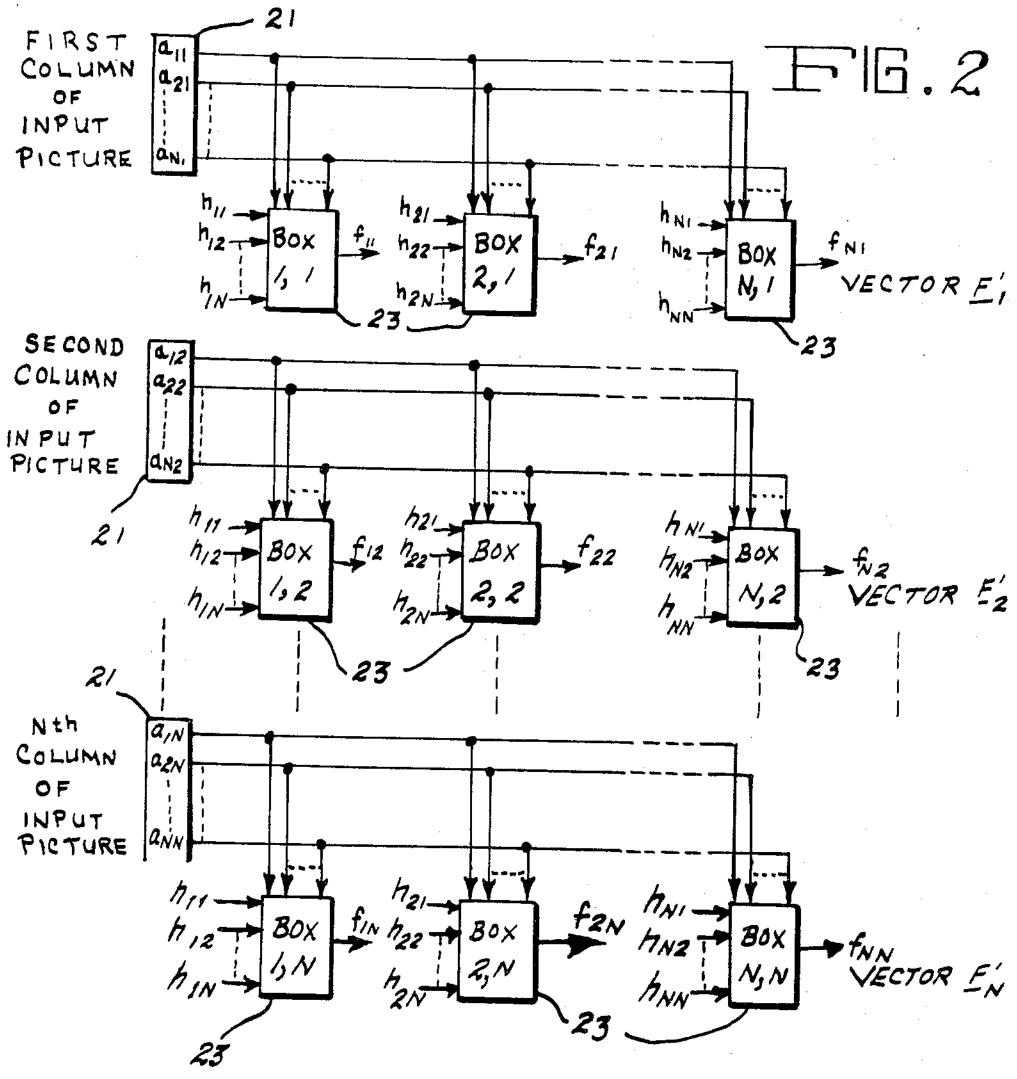
FIG. 2 is a detail of the $\pi_1$ machine shown in FIG. 1.
Figure 3:
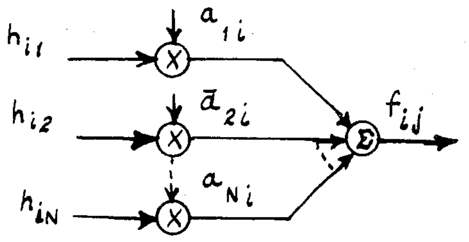
FIG. 3 is a detail of the multiplying and summing apparatus designated as the boxes shown in FIG. 2.

Inputs to $\pi_1$ machine 15 are the $N^2$ picture elements and the $N^2$ elements of the Hadamard matrix. The outputs of the $\pi_1$ machine 15 are the N vectors $\underline{F}_i'$ (each has N components). FIG. 2 shows the implementation of $\pi_1$ machine performing the functions of Equations (12) and (13). There are $N^2$ outputs from the $\pi_1$ machine, each one is one component of an $\underline{F}_i'$ vector. Each of the columns of picture 11 appear as separate column matrices 21. The computations are performed in boxes 23. FIG. 3 shows the contents of boxes 23 which perform the multiplication and sums the products thereof.

Figure 4:
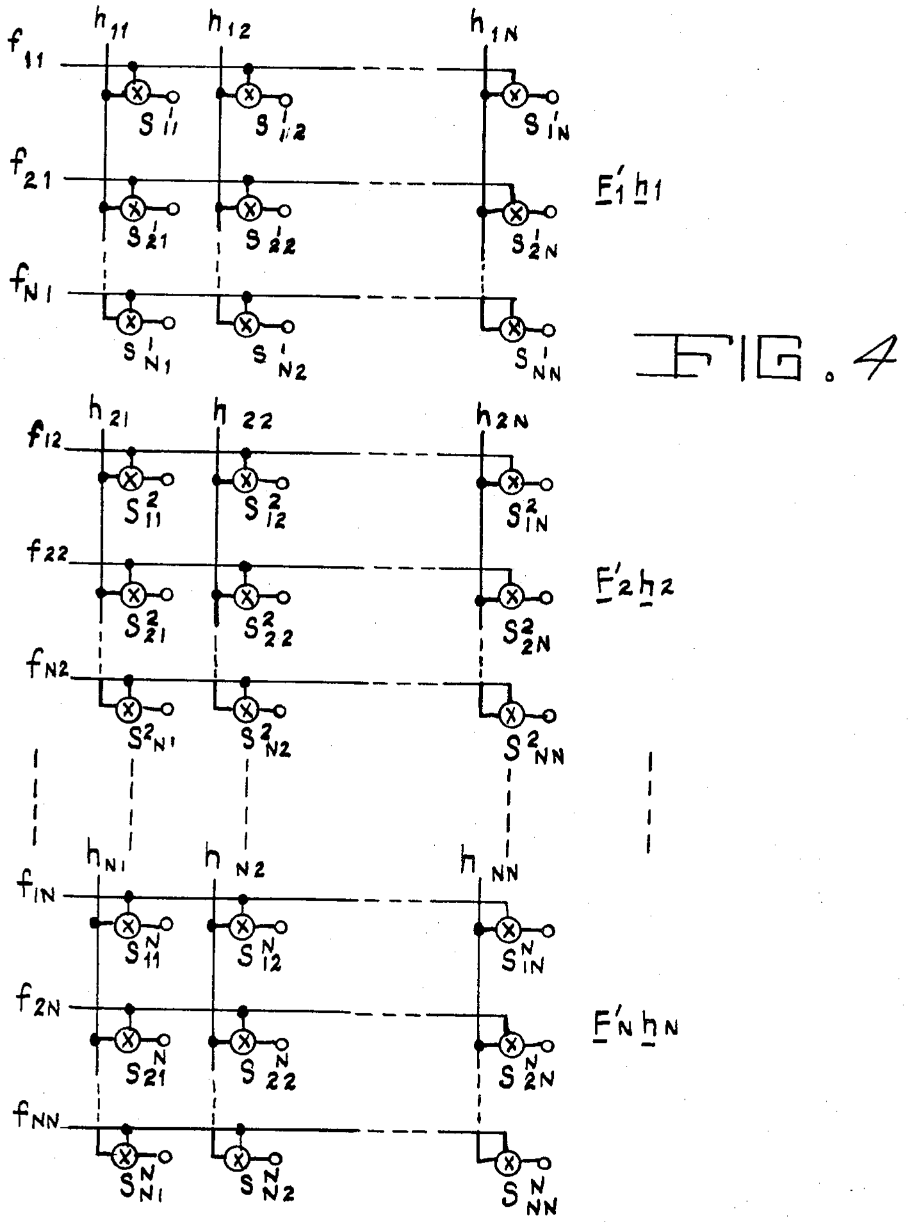
FIG. 4 is a detail of the $\pi_2$ machine shown in FIG. 1.
Figure 5:
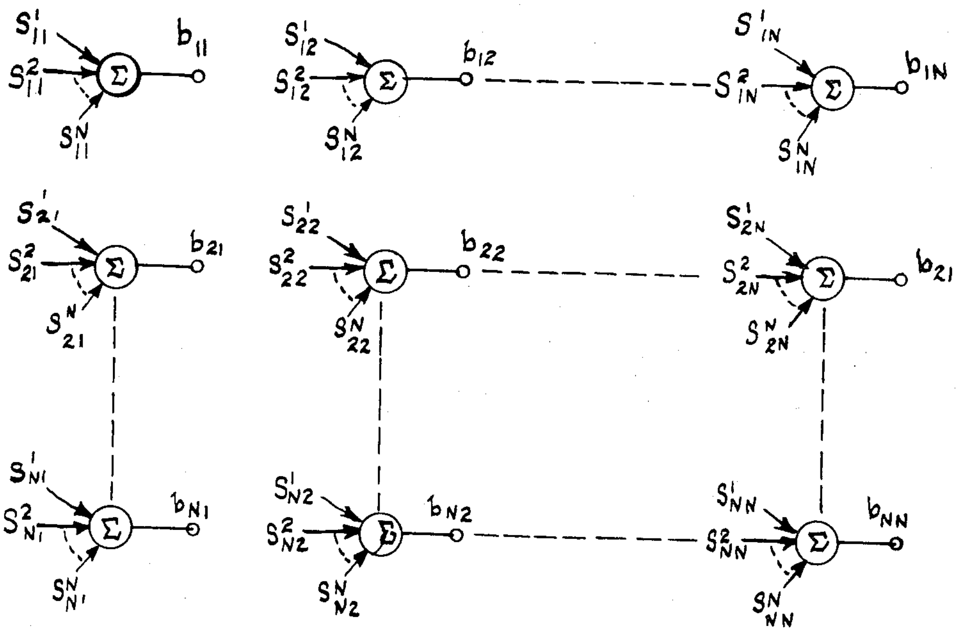
FIG. 5 is a detail of the $\Sigma$ machine shown in FIG. 1.

FIG. 4 shows the details of the $\pi_2$ machine 17 (FIG. 1) and performs the operations $\underline{F}_i'$ $\underline{h}_i$ for $i$=1, 2, . . . N in accordance with Equation (14). FIG. 5 shows the Σ machine 19 which adds the respective elements of the output partial transform from the machine 17 to give the Walsh-Hadamard transform of picture 11. Each $b_{ij}$ output of the Σ machine 19 is the $ij^{th}$ entry of the Walsh-Hadamard transformed matrix.

The $\pi_1$ machine requires $(N^2)\cdot N$ product circuits and $N^2$ summing circuits. The $\pi_2$ machine requires $(N^2)\cdot N$ product circuits and the Σ machine requires $N^2$ summing circuits. Total hardware for this machine is $2N^3$ product and $2N^2$ summing circuits. The longest time required to obtain the complete 11 transform of any picture would be $t_1 + t_2 + t_1 + t_2 = 2t_1 + 2t_2$ where $t_1$ is the time required to generate the product and $t_2$ required to generate the sum.

For binary pictures (where each picture element is black or white), one of the two inputs to each of the product circuits in the $\pi_1$ machine is a binary 0 or 1. Thus, the $N^2$ product circuits for the $\pi_1$ machine would be inexpensive electronic switches that are closed (give a zero output) when the input from the picture is zero, and open (pass through the values of $\pm 1$) only when the input from the picture is 1. Then the hardware required for this machine would be $N^3$ switches, $N^3$ product and $2N^2$ summing circuits, and the longest time required to obtain the complete Hadamard transform would be $t_0 + 2t_2 + t_1$ where $t_1$ and $t_2$ are as previously explained and $t_0$ is the time required to set the switches of the $\pi_1$ machine.

The inputs to the machine from the Hadamard matrix can be permanently connected after the dimensions of the pictures that the machine would operate upon have been determined and each picture element corresponds to one input of each of the N product circuits.

Sophisticated hybrid systems can be adapted to handle input pictures of various dimensions. In such a design the digital computer keeps track of the dimensions of the input pictures and controls the number of gates (product or summing circuits) to be operational at each time.

As an example of the operation of the invention let $A = [a_{ij}]$ be an N×N picture and H an N×N symmetric Hadamard matrix. The Walsh-Hadamard is obtained from the matrix products $B = HAH$ where $$HA = \begin{bmatrix} \sum_i h_{1i}a_{i1} & \sum_i h_{2i}a_{i2} & \cdots & \sum_i h_{1i}a_{iN} \\ \sum_i h_{2i}a_{i1} & \sum_i h_{2i}a_{i2} & \cdots & \sum_i h_{2i}a_{iN} \\ \sum_i h_{Ni}a_{i1} & \cdots & \cdots & \sum_i h_{Ni}a_{iN} \end{bmatrix} = C$$

$$C_{il} = \sum_k h_{ik}a_{kl} \quad i,l = 1, 2, \cdots, N$$

$$HAH = \begin{bmatrix} \sum_i c_{1i}h_{i1} & \sum_i c_{1i}k_{i2} & \cdots & \sum_i c_{1i}k_{iN} \\ \sum_i c_{2i}h_{i1} & \sum_i c_{2i}h_{i2} & \cdots & \sum_i c_{2i}h_{iN} \\ \sum_i c_{Ni}h_{i1} & \cdots & \cdots & \sum_i c_{Ni}h_{iN} \end{bmatrix} = B$$

Thus $$b_{ij} = \sum_l c_{il}h_{lj} = \sum_l \sum_k h_{ik}a_{kl}h_{lj} \quad i,j = 1, 2, \cdots, N$$

The Walsh-Hadamard transform is obtained through decomposition by row from Equation (11)

$$B = \sum_k \underline{h}_k' \underline{F}_k$$

Therefore $$b_{ij} = \sum_k h_{ik}f_{kj} = \sum_k h_{ik} \sum_l a_{kl}h_{lj} = \sum_k \sum_l h_{ik}a_{kl}h_{lj}$$

The Walsh-Hadamard transform through decomposition by column is obtained from Equation (14)

$$B = \sum_l \underline{F}_l' \underline{h}_l.$$

Therefore $$b_{ij} = \sum_l f_{il}h_{lj} = \sum \sum$$

In the decomposition by column of a binary picture assume a figure is represented by the 4×4 binary matrix A $$A = \begin{bmatrix} 0 & 1 & 0 & 0 \\ 0 & 1 & 1 & 0 \\ 0 & 1 & 1 & 0 \\ 0 & 1 & 1 & 0 \end{bmatrix}.$$

The 4 × 4 Hadamard matrix in natural form is $$H = \begin{bmatrix} 1 & & 1 & 1 \\ 1 & - & 1 & -1 \\ 1 & & -1 & -1 \\ 1 & - & -1 & 1 \end{bmatrix}$$

From Equation (15) the Walsh-Hadamard transform of A is expressed as:

$$B = (\underline{F}_2^{1,4})'\underline{h}_2 + (\underline{F}_3^{2,4})'\underline{h}_3 = \begin{bmatrix} 4 \\ 0 \\ 0 \\ 0 \end{bmatrix} [1 \ -1 \ 1 \ -1]$$

$$+ \begin{bmatrix} 3 \\ -1 \\ -1 \\ -1 \end{bmatrix} [1 \ 1 \ -1 \ -1] = \begin{bmatrix} 7 & -1 & 1 & -7 \\ -1 & -1 & 1 & 1 \\ -1 & -1 & 1 & 1 \\ -1 & -1 & 1 & 1 \end{bmatrix}$$

Figure 6:
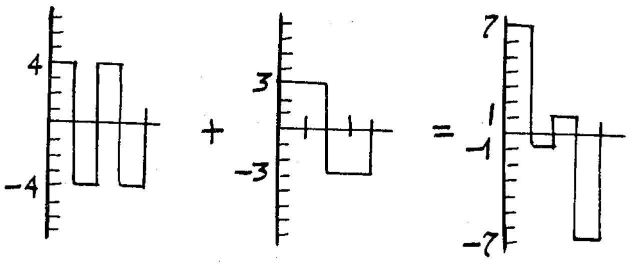
FIG. 6 are amplitude-sequency graphs useful in the explanation of the invention.

It is noted that the rows of the Walsh-Hadamard transformed matrix are the sums of rectangular waveforms (in this instance two) whose amplitude is given by the entries of vector $(\underline{F}_l)'$ and sequency by the sequency of the row vector $\underline{h}_l$. For example, the first row of the resultant Walsh-Hadamard transformed matrix is the sum of two waves as shown in FIG. 6. Thus the decomposition theorem makes it possible to represent each row of the Walsh-Hadamard transformed matrix as the sum of rectangular waveforms of various amplitudes and sequencies.

What is claimed is:

1. A system for transforming a discrete two-dimensional figure into a Walsh-Hadamard digital form, the figure consisting of a matrix having N rows and N columns of optical density samples comprising:

a. storage means for a Hadamard matrix having N row vectors and N column vectors the column vectors being the transpose of the row vectors;

b. a plurality of means for parallel multiplying the matrix of samples with the Hadamard matrix producing N column vectors, each of the plurality of parallel multiplying means including, 1. a plurality of multipliers, each of the multipliers being fed by one of the elements of a specified column of the sample matrix and one of the elements of a specified row of the Hadamard matrix, and
2. means for summing the outputs of the plurality of multipliers, the sums being elements of column vectors F', c. a plurality of matrix multipliers for forming $N^2$ matrix products of the $\underline{F}'$ column vectors and the rows of Hadamard matrix, each of the matrix multipliers having row and column inputs for multiplying every element of a specified column vector with every element of a specified row vector; and d. a matrix of summers with each of the summers being fed by the products from the multipliers in the plurality of matrix multipliers formed by the multiplication of one row of the Hadamard matrix with one F' column vector, the output of the matrix of summers being the entries of the Walsh-Hadamard transform.

* * * * *